United States Patent [19]

Robertson et al.

[11] Patent Number: 5,179,528
[45] Date of Patent: Jan. 12, 1993

[54] SIGNAL PROCESSING SYSTEM AND METHOD IMPLEMENTING A NON-LINEAR TRANSFER FUNCTION APPROXIMATED BY A PIECEWISE LINEAR TRANSFORMATION

[75] Inventors: James E. Robertson, Denton; Jon C. Noeth, Garland; Terry L. Zumwalt, Garland; Glenn T. Mortland, Garland; David O. Box, McKinney, all of Tex.

[73] Assignee: Texas Instruments Incorporated, Dallas, Tex.

[21] Appl. No.: 841,867

[22] Filed: Feb. 26, 1992

Related U.S. Application Data

[63] Continuation of Ser. No. 440,918, Nov. 22, 1989, abandoned.

[51] Int. Cl.⁵ ............................................. G06F 15/00
[52] U.S. Cl. ............................................... 364/715.02
[58] Field of Search .................... 364/715.01, 715.02, 364/852, 157; 330/278; 358/166, 174; 382/56

[56] References Cited

U.S. PATENT DOCUMENTS

| | | | |
|---|---|---|---|
| 4,621,290 | 11/1986 | Fling | 358/166 |
| 4,747,065 | 5/1988 | West | 364/715.01 |
| 4,785,418 | 11/1988 | Pearce et al. | 364/715.01 |

Primary Examiner—Tan V. Mai
Attorney, Agent, or Firm—René E. Grossman; Richard L. Donaldson

[57] ABSTRACT

A programmable PLT transfer function circuit (50) uses a piecewise linear transformation (PLT) to approximate a non-linear transfer function (FIGS. 1B and 1C). The non-linear transfer function is approximated by a selected number of linear PLT segment transfer functions, each of which applies to a selected range of input data values, and is characterized by a PLT transformation (mx+b) in which output data is obtained by multiplying the input data by a gain coefficient and then adding an offset coefficient. The gain and offset coefficients that characterize the PLT segment transfer functions are updated at regular intervals, and stored in the PLT transfer function circuit (50). For each input data sample, segment selection logic (52) selects the appropriate PLT segment. The input data sample is then referenced (61) to the segment breakpoint (i.e. the initial data value) for that segment. The referenced input data sample is then multiplied (62) by the appropriate gain coefficient provided by gain selection logic (56). The gain multiplication operation is a quasi-floating point operation performed by a funnel shifter (63) and a multiplier (64). An offset addition operation (66) then adds to the gain-multiplied input data sample the appropriate offset coefficient provided by offset coefficient selection logic (58), to complete the PLT transformation. The PLT transfer function approximation technique is described in connection with a range compression system for thermal imaging.

38 Claims, 5 Drawing Sheets

SIGNAL PROCESSING SYSTEM AND METHOD IMPLEMENTING A NON-LINEAR TRANSFER FUNCTION APPROXIMATED BY A PIECEWISE LINEAR TRANSFORMATION

RELATED APPLICATIONS

This application is a continuation of application Ser. No. 07/440,918 filed Nov. 22, 1989, entitled "Signal Processing System and Method Implementing a Non-Linear Transfer Function Approximated by a Piecewise Linear Transformation" by James E. Robertson, Jon Carl Noeth, Terry Lee Zumwalt, Glenn Timothy Mortland and David Oliver Box, now abandoned.

TECHNICAL FIELD OF THE INVENTION

This invention relates in general to control systems in which input and output are related by a transfer function, and more particularly, to a signal processing system and method implementing a non-linear transfer function approximated by a piecewise linear transformation.

BACKGROUND OF THE INVENTION

In general, a transfer function relates the output of a control system to its input. For many control system applications, the desired transfer function is non-linear, and the control system includes a network that approximates the non-linear transfer function.

An exemplary application for a signal processing control system is as a range-compression system for digitized image data. Video or thermal imaging systems often convert video or thermal information into digital form for processing—image signals are converted into digital samples, or pixel (picture element) data, of an arbitrary bit-length. Often, to improve dynamic range and signal processing accuracy, pixel data are generated and processed using a larger range of values (i.e., a larger bit length) than the 8-bit gray-scale format conventionally used by video displays (providing 256 gray-scale values). Thus, the pixel data generated in, for example, a 16-bit format must be range compressed into the standard 8-bit video display format.

The conventional approach to providing range compression is to filter the pixel data using a compression algorithm. Many such compression algorithms are known in the art.

However, these range-compression techniques do not evaluate from a histographic standpoint the pixel data that form a scene (or image), nor do they permit selective real-time modification of the compression algorithm to achieve minimum image information loss. That is, no attempt is made to optimize the transfer function embodied in range-compression algorithms implemented by conventional range-compression systems for histographic changes in the distribution of input pixel data (such as frame-to-frame).

For example, a thermal-image histograph of a scene at the horizon will have two pixel distribution peaks—one for sky and one for land. Within each peak, maximizing contrast so as to differentiate objects requires maximizing differentiation between pixels, i.e., minimizing range compression. Thus, an ideal range-compression transfer function for such a thermal imaging application would have non-linear gain characteristics, providing at least two high gain (i.e., high pixel differentiation) segments corresponding to the two pixel distribution peaks, with data compression (i.e., loss of pixel differentiation) being concentrated outside those segments. Moreover, as the scene data changes frame-to-frame, the associated non-linear transfer function embodied in the range-compression system should also change, typically in non-linear fashion.

Conventional compression algorithms do not take into account histographic frame-to-frame pixel distribution. Moreover, the range-compression systems implementing these conventional compression algorithms are not dynamically programmable, i.e., the transfer function embodied in these systems cannot be modified in real time after an arbitrary number of pixels (such as a single frame) to accommodate scene data changes manifested in the histographic pixel distribution.

One approach used by signal processing control systems to selectively implement a non-linear transfer function is to use a lookup table. The lookup table approach has the advantage of obviating the dynamic (programmable) update/modification of a transfer function used to implement real-time computation of output sample values. Rather, each possible input sample value has associated with it a memory location that stores a predetermined, output sample value. For the exemplary range-compression system, assuming a 16-bit scene data input that must be range-compressed into the standard 8-bit video display format, a lookup table of at least 65,536×8 bits would be required to store a computed range-compressed pixel value (0-255) for each of the possible input pixels. If the lookup table operation is made dynamic by regularly recomputing and updating the table values that embody the non-linear transfer function, then to maintain throughput, at least two identical lookup tables would typically be required, one of which would be active while the other was being updated.

A dual dynamically-updated lookup table approach is extremely flexible, and can be made as non-linear as desired However, this approach is disadvantageous in that it requires a relatively large number of integrated circuit components, requiring a relatively large amount of PCB (printed circuit board) surface area. Moreover, the processing time required to regularly update the table values (such as on a frame-by-frame basis in the exemplary range-compression application) correspondingly reduces the signal processing time available for data analysis. These disadvantages significantly reduce the utility of the lookup table approach to implementing a non-linear transfer function operation.

The exemplary range-compression application used in the above discussion is merely illustrative of a generalized non-linear transfer function analysis for signal (control) processing. This analysis is applicable to numerous other signal processing applications, including medical imaging and high definition television.

Accordingly, a need exists for a signal processing system incorporating a transfer function generator capable of dynamically (programmably) implementing a non-linear transfer function.

SUMMARY OF THE INVENTION

The present invention is a digital signal processing (control) system that uses a programmable piecewise linear transformation (PLT) technique to provide a dynamically updated approximation of a non-linear transfer function.

In one aspect of the invention, the PLT signal processing system implements a non-linear transfer function using a piecewise linear transformation in which each linear piece or segment is characterized by a PLT mx+b transformation of the input data where m is a gain (slope) coefficient and b is the corresponding offset coefficient. A PLT processor analyzes the input data to determine the appropriate PLT segments, each identified by a corresponding segment coefficient and characterized by associated gain and offset coefficients. For each input sample, segment selection logic synchronized with the input data selects a segment code identifying the appropriate segment for the input data values—gain multiplication logic is responsive to the segment code for multiplying the input data by the appropriate gain coefficients, while offset addition logic is responsive to the segment code for adding to the input data the appropriate offset coefficients.

Preferably, the PLT processor determines the multiple PLT transfer function segments by analyzing the histographic distribution of the input data values. Each segment can be identified by a segment breakpoint corresponding to the initial value for the input data values in that segment.

In more specific aspects of the invention, the PLT processor recomputes segment, gain and offset coefficients at predetermined intervals. These coefficients are stored in respective latch networks and synchronously read out for PLT operations in connection with the input data associated with that interval (i.e., until the stored coefficients are updated for the next interval). The segment selection logic compares each input sample with the segment breakpoints, and provides the appropriate segment code used to select the corresponding coefficients. In a reference breakpoint-subtraction operation, the segment breakpoint coefficient (i.e, the initial segment value) is subtracted from the input sample to reference the sample to the breakpoint, thereby requiring fewer bits (and therefore reduced bus widths) for the PLT gain multiplication and offset addition operations. The gain multiplication operation implements quasi-floating-point multiplication, with the gain coefficient including an exponent field and a mantissa field, to provide greater range for that operation.

In an exemplary application, the PLT signal processing system is used to range compress thermal image pixel data for video display according to the histographic frame-to-frame distribution of the pixel data. The reference breakpoint-subtraction operation references the input pixel to the associated segment breakpoint. The gain mulitiplication operation uses a tunnel shifter to perform exponentiation and bit reduction. The offset addition operation is followed by a final range-compression clipping operation.

The technical advantages of the invention include the following. The PLT signal processing system uses a programmable piecewise linear transformation to selectively approximate a non-linear transfer function. The piecewise linear transformation technique accomplishes transfer function approximation using an arbitrary number of segments, each individually definable in terms of operable range, gain (slope) and offset. The segment coefficient that determines segment size, and the corresponding gain and offset coefficients, can be selected based on a histographic distribution of input data values to optimize the transfer function to the input signal. The PLT transfer function is dynamically updated at selected intervals by recomputing the coefficients based on histographic distribution during each interval. The use of quasi-floating point gain multiplication provides greater range for the multiplication operation, with LS bits that represent unnecessary precision being discardable after exponentiation. The programmable transfer function approach of the invention is readily adaptable to general signal processing applications in which a non-linear response to an input signal is required.

BRIEF DESCRIPTION OF THE DRAWINGS

For a more complete understanding of the present invention, and for further features and advantages, reference is now made to the following Detailed Description, taken in conjunction with the accompanying Drawings, in which:

FIGS. 1b–1c are alternate exemplary non-linear PLT transfer functions for range-compressing the input thermal image represented by the histograph in FIG. 1a;

DETAILED DESCRIPTION OF THE INVENTION

The Detailed Description of the preferred embodiment of the PLT signal processing system and method of the invention, including a programmable PLT transfer function circuit, is organized as follows:
1. PLT Approximation
2. General Functional Description
3. Circuit Description
   3.1 Signal Input/Output
   3.2 PLT Transfer Function Circuit
4. Operation
   4.1 Coefficient Update
   4.2 Range Compression
5. Conclusion The preferred embodiment of the invention is described in relation to an exemplary application of the PLT signal processing technique in a thermal imaging system in which the programmable PLT transfer function circuit is used to compress input 16-bit thermal image scene data into a standard 8-bit video display format. The thermal imaging system includes a thermal detection subsystem that generates successive frames of 16-bit digitized pixel samples that are input to the PLT transfer function circuit.

The thermal imaging system's signal processor statistically analyzes each frame of scene data from the thermal detection subsystem, and generates the corresponding segment, gain and offset coefficients used by the PLT transfer function circuit to implement a piecewise linear transformation approximation of a non-linear range-compression transfer function. For each frame of scene data, the signal processor recomputes these coefficients from the corresponding histographic distribution of input pixel samples, which are then stored in the PLT transfer function circuit for use in range compressing the pixels for that frame.

While the Detailed Description is in relation to the exemplary range-compression application, the PLT signal processing system and method of the invention has generalized application to signal processing control system applications in which a non-linear transfer function is required.

1. PLT Approximation. The PLT transfer function approach of the invention uses a piecewise linear transformation to approximate a non-linear transfer function. For the exemplary range-compression application, the PLT approximation is illustrated in FIGS 1a–1c.

Figure 1A:
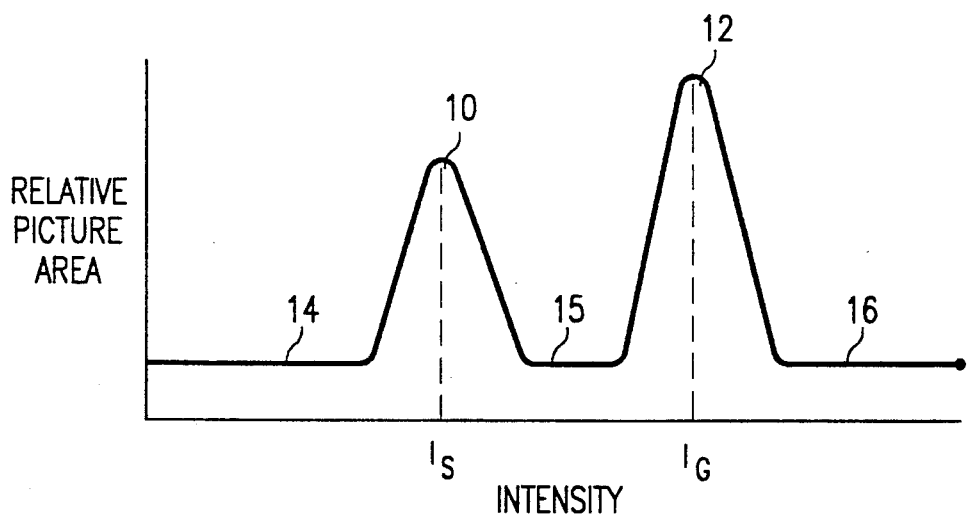
FIG. 1a is a histographic plot of an exemplary thermal image scene showing pixel sample distribution as a function of pixel intensity.
Figure 1B:
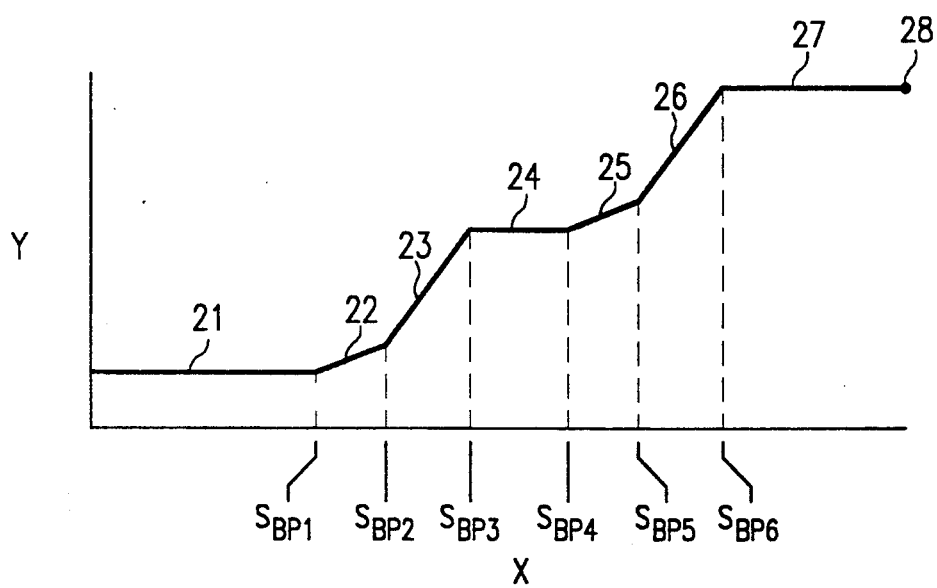
Figure 1C:
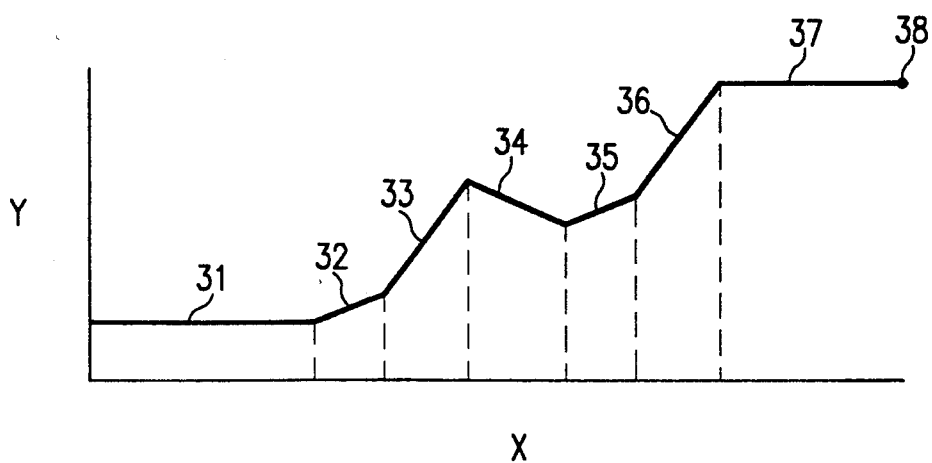

FIG. 1a is a histogram of a thermal image scene showing both sky and ground, as discussed in the Background section. The histograph shows the relative distribution of the image pixels in terms of thermal intensity as represented by a 16-bit pixel value. The histograph illustrates that scene data (thermal image information) is concentrated in two peaks associated with the sky (10) and the somewhat warmer ground (12), with relatively little scene data being contributed by other potential pixel values (14, 15, 16).

The exemplary PLT range-compression system is required to compress the 16-bit scene data (65,536 possible pixel values) into a conventional 8-bit video display format (256 values). The PLT technique is used to approximate a non-linear transfer function that effects range compression by maximizing pixel differentiation (i.e., minimizing range compression) in the peak areas (10, 12) while concentrating range compression in those areas (14, 15, 16) that contribute little thermal information. That is, the non-linear PLT transfer function causes most of the 8-bit video display data to be concentrated in the two areas (10, 12) of peak thermal information, minimizing compression for that information to preserve contrast differentiation. The design trade-off is a significant increase in compression for the thermal information contained in the other areas (14, 15, 16) where preserving contrast differentiation is less important.

The PLT approximation of a non-linear range-compression transfer function for the scene data of FIG. 1a divides the 16-bit range of input pixel values (maximum 65,536) into 8 segments, each being assigned an arbitrary segment range. Each segment is characterized by a linear transformation:

$$y = mx + b$$

where x is an input pixel value within the range of values for that segment and y is the corresponding output pixel value in an 8-bit video display format (maximum 256). A segment coefficient defines the initial value of the segment range, and is designated as the segment breakpoint. For each segment, the gain (slope) coefficient m determines the amount of range-compression (thereby establishing the amount of pixel differentiation), while the offset coefficient b provides an appropriate offset level to account for segmentation.

In the context of range-compressing the scene data represented by the histogram in FIG. 1a, a suitable PLT approximation of a range-compression transfer function assigns one segment to each of the maximum compression areas 14, 15 and 16, and two segments to each of the minimum compression areas 10 and 12 associated with the histographic peaks (the eighth segment is not used). In the maximum compression segments, the gain coefficient is zero or some relatively small number, so that a minimum number of output pixel values are assigned to those areas. In the areas 10 and 12 of concentrated thermal information, each PLT transfer function gain coefficient is relatively large, so that a maximum number of output pixel sample values are assigned to those areas, minimizing compression and maximizing contrast differentiation based. The resulting non-linear PLT transfer function is optimized for the histographic distribution of pixels associated with the input scene data.

FIG. 1b illustrates an exemplary PLT approximation of a range-compression transfer function according to the invention. The PLT transfer function is defined by seven segments 21–27, each with an associated segment coefficient breakpoint $S_{BP0}$–$S_{BP6}$, with an eighth segment 28 being unused (null).

Segment 21 corresponds to the minimum-thermal-information area 14, and is characterized by a gain coefficient of zero (i.e., all input pixel values in that segment are assigned an output pixel value of zero) so that no differentiation is preserved. Segments 22 and 23 correspond to the first maximum-thermal-information area 10—each segment is characterized by a corresponding gain coefficient and offset coefficient such that the input 16-bit pixel values are range compressed into 8-bit video data. Segment 24 corresponds to the minimum-thermal-information area 15, and is characterized by a gain coefficient of zero (with an appropriate offset). Segments 25 and 26 correspond to the maximum-thermal-information area 12, and are each characterized by corresponding gain and offset coefficients. Finally, segment 27 corresponds to the minimum-thermal-information area 16, and is characterized by a gain coefficient of zero (with an appropriate offset).

To achieve an overall non-linear range-compression transfer function that compresses the full range of input pixel values (65,536) into the available range of output values (256), the segment, gain and offset coefficients must be cooperatively chosen. Thus, if all input pixel values associated with segment 21 are assigned an output pixel value of zero, and all input pixel values associated with segment 27 are assigned the maximum output pixel value of 255, and only one output pixel value is assigned to the input pixel values associated with segment 24, then the remaining 253 output pixel values are available to be assigned to the input pixel values associated with segments 22/23 and 25/26. For the segments 22/23 and 25/26, respective gain coefficients are chosen to achieve a desired distribution of output pixel values.

FIG. 1c is a plot of an alternate range-compression transfer function that achieves higher gain (greater differentiation) for the maximum-thermal-information areas 10 and 12, by using negative gain for the minimum-thermal-information area 15. The segment breakpoints are identical to those for the transfer function in FIG. 1b, with segments 31–37 corresponding to segments 21–27. Analogous to segments 21 and 27 in FIG. 1b, segments 31 and 37 correspond to the minimum-thermal-information area 14 and 16. Segments 32/33 (analogous to segments 22/23 in FIG. 1b) correspond to the maximum-thermal-information area 10, while segments 35/36 correspond to the maximum-thermal-information area 12.

In contrast to the segment 24 in FIG. 1b (which was assigned a gain coefficient of zero), the segment 34 (corresponding to the minimum-thermal-information area 15) is assigned a negative gain coefficient. As a result, segments 32/33 and 35/36 can be assigned higher gain coefficients than the corresponding segments 22/23 and 25/26 in FIG. 1b. That is, the segments 32/33 and 35/36 associated with the ranges of input pixel values where maximum differentiation (contrast) is desired can be assigned higher gain coefficients while still achieving an overall range-compression transfer function with a maximum output video data value of 255. The design trade-off is that some image information (contrast) is lost in the region of negative gain (i.e., where more than one input value is associated with a given output value).

The PLT technique of the invention has been described in connection with implementing two exemplary transfer functions (FIGS. 1b and 1c) for range compressing an exemplary thermal image scene (FIG. 1a). Selecting an appropriate PLT transfer function optimized for a given thermal image scene is a matter of conventional PLT processing to select appropriate segmentation, gain and offset coefficients based on the histographic input pixel distribution.

Figure 2:
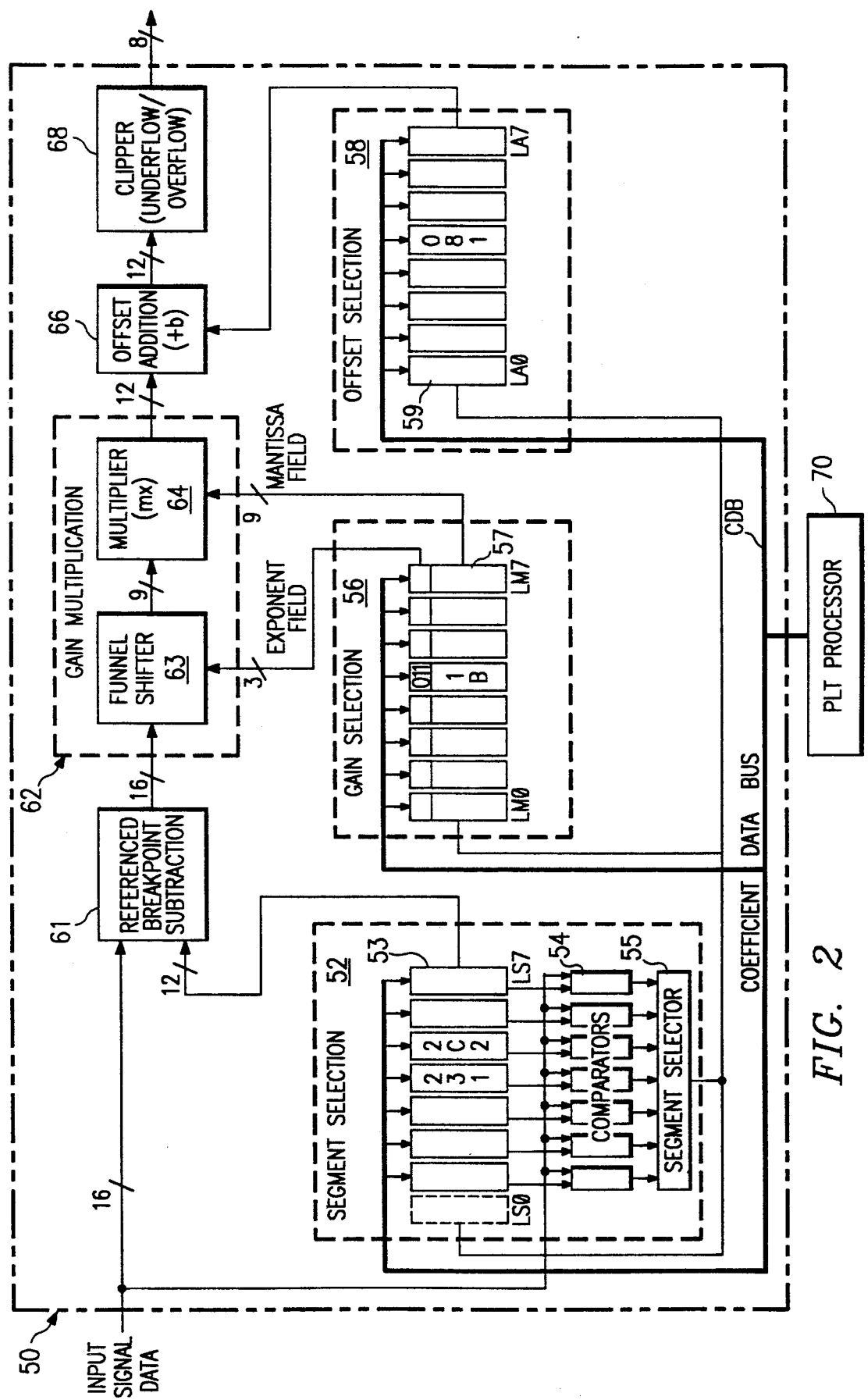
FIG. 2 is a general functional block diagram of an exemplary range-compression processing system including a programmable PLT transfer function circuit.

2. Functional Description. FIG. 2 is a general functional diagram for the programmable PLT transfer function circuit of the invention. As described in Section 1, the PLT transfer function circuit implements a selected non-linear transfer function using a piecewise linear transformation approximation. Using the PLT technique, the input range of pixel values are segmented, and a linear transformation (mx+b) is assigned to each segment to achieve a desired compression. A non-linear range-compression transfer function is defined by a maximum of 8 segments each characterized by a segment breakpoint coefficient, and a characteristic gain coefficient (m) and associated offset coefficient (b).

A PLT transfer function circuit 50 receives 16-bit pixel data from the thermal detection subsystem. For each input pixel, the circuit performs coefficient selection operations that establish the range-compression transfer function, and range compression operations using the selected segment, gain and offset coefficients to compress the input pixel data into an 8-bit video data format.

A segment selection operation 52 stores segment breakpoint coefficients in latch storage 53. Comparators 54 and a segment selector 55 compare an input pixel value with the segment breakpoint coefficients, and select the appropriate one-of-eight segments, providing a corresponding segment code.

For each input pixel, the selected segment code is used to designate a corresponding segment breakpoint coefficient, and to select the corresponding gain and offset coefficients used to perform the associated PLT transformation mx+b. In synchronism with the input pixel data, the segment selection operation 52 provides the corresponding segment breakpoint coefficient stored in the segment coefficient latches 53, while a gain selection operation 56 provides the associated gain coefficient (m) stored in gain coefficient latches 57, and an offset selection operation 58 provides the associated offset coefficient (b) stored in offset coefficient latches 59.

A reference breakpoint-subtraction operation 61 subtracts from the input pixel value the corresponding segment breakpoint coefficient provided by the segment selection operation. This operation references the input pixel to the segment breakpoint, thereby reducing the bit range for the referenced pixel, and enabling the subsequent gain multiplication operation to be performed without increasing bit range (or associated data bus widths) to accommodate multiplication overflows.

Gain multiplication is performed by a quasi-floating point multiplication operation 62, using a funnel-shifter 63 and a multiplier 64. The quasi-floating point gain multiplication operation is described in detail in Section 4. Basically, to achieve a greater range of gain multiplication, a 12-bit gain coefficient is divided into a 3-bit gain exponent field and a 9-bit gain mantissa field (a format characteristic of floating point multiplication). The funnel-shifter performs an exponentiation operation, and the multiplier 64 performs a mantissa multiplication operation.

Offset addition is performed by an offset addition operation 66. This operation adds the designated offset coefficient provided by the offset selection operation, completing the PLT mx+b transformation.

Finally, a clipper operation 68 provides underflow-/overflow protection, and achieves final range-compression, by clipping the 12-bit transformed pixel value to an 8-bit video data format. The output from clipper operation 68 is the 8-bit output video data that comprises the output from the PLT transfer function circuit 50.

For the exemplary range compression application in a thermal imaging system, the segment breakpoint coefficients and the associated gain and offset coefficients are provided by the signal processor in the thermal imaging system, which performs the PLT analysis of the histographic distribution of thermal image pixel data described in Section 1. This PLT processing function is represented in FIG. 2 as PLT processor 70. The designation "PLT processor" is intended to be an entirely general functional designation—this PLT processing function can be implemented in a number of ways, such as by a custom processor chip or as a task in a general system processor.

The PLT processor receives digitized thermal image pixel samples from a thermal detector subsystem (not shown). Using conventional signal processing techniques, the PLT processor performs a statistical and histographic analysis of the input pixel data on a frame-by-frame basis, and implements a piecewise linear transformation of that histographic data to obtain the coefficients that determine the PLT range-compression transfer function for each frame of input scene data.

For each thermal image frame, a statistical selection of thermal image pixels are analyzed by PLT processor 70 to characterize the histographic distribution of pixels in the frame. For example, with reference to FIG. 1a, the PLT processing function could determine the mean and RMS variation for each of the histographic peaks 10 and 12 corresponding to the sky and ground. Using a conventional mean and RMS variation statistical analysis, the PLT processor 70 would compute an optimum number of segments, and the associated gain and offset coefficients for each segment to achieve the desired mx+b transformation for that segment (given the overall constraint of compressing the 16-bit input pixel values into the 8-bit video display format using up to eight segments).

The segment, gain and offset coefficients are updated at selected intervals by the PLT processor, and provided over a coefficient data bus CDB to respective latch networks 53, 57 and 59 for storage. Selecting an update interval is a design choice. The recommended update interval is once every image frame, although update intervals of more or less than one frame may be used.

Updating the segment and associated gain and offset coefficients on a frame-by-frame basis typically will require one-or-two frames to complete the signal processing operations associated with computing these coefficients. The thermal imaging system can incorporate a corresponding pipeline delay in providing input pixel data to the PLT transfer function circuit. Alternatively, this coefficient processing delay can be ignored based on an assumption that the coefficients will not change significantly over a one-or-two frame interval.

Figure 3A:
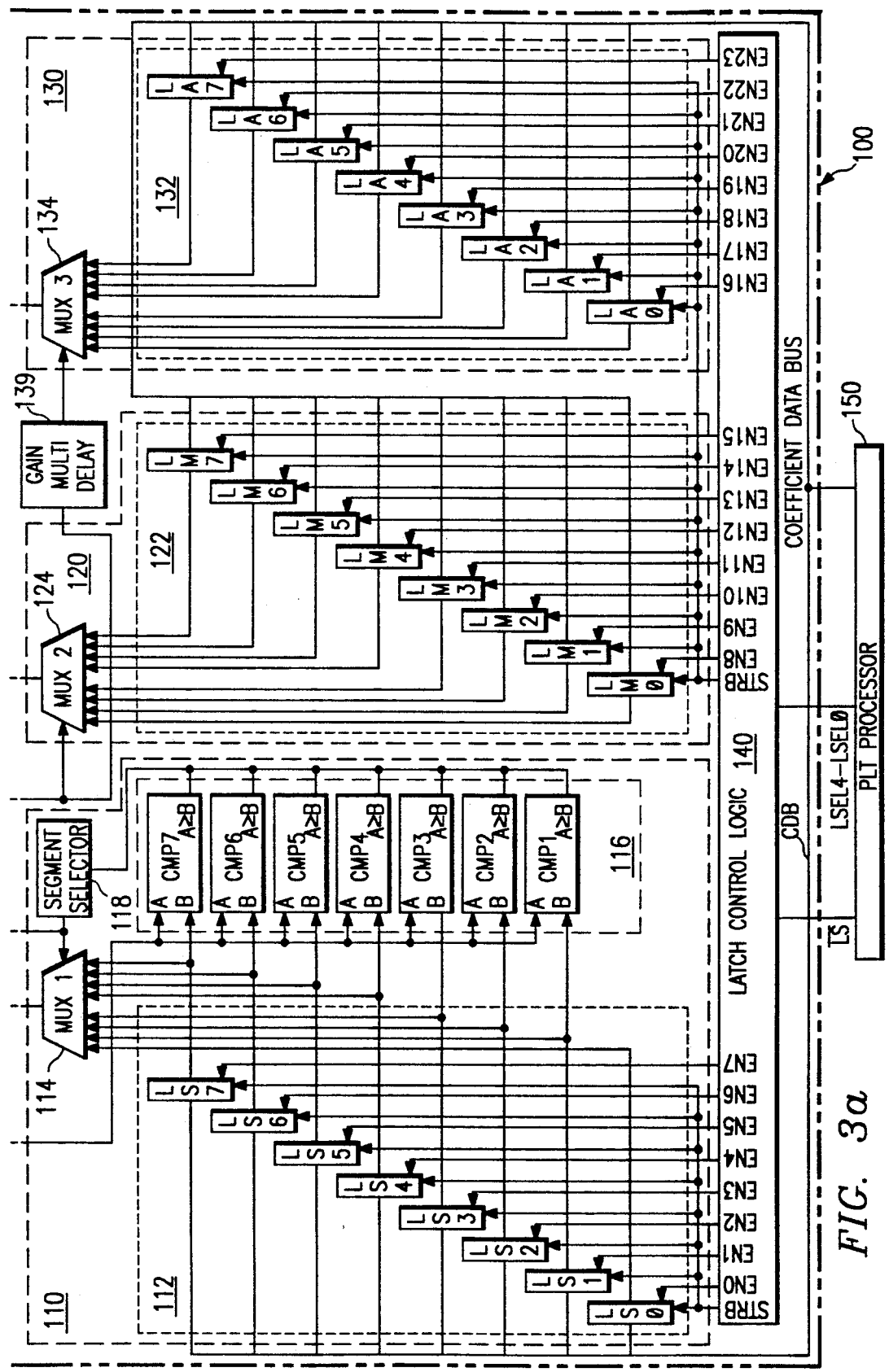
FIGS. 3a–3b are a schematic block diagram of the PLT transfer function circuit.
Figure 3B:
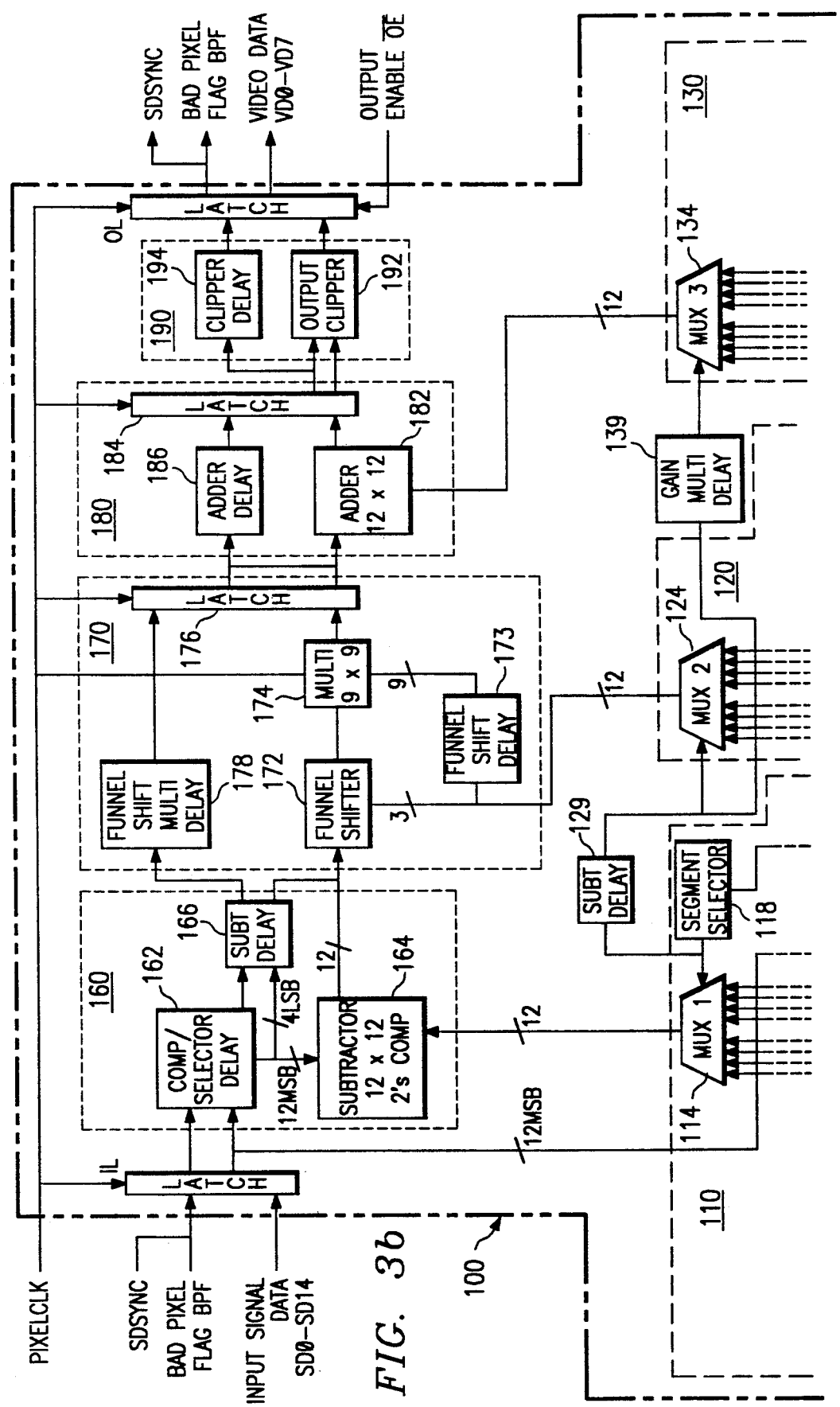

3. Circuit Description. FIGS. 3a and 3b are schematic block diagrams of the PLT transfer function circuit of the invention, configured for the exemplary application of providing range compression in a thermal imaging system. Implementing the transfer function circuit as an application specific integrated circuit (ASIC) is recommended.

The exemplary range-compression transfer function circuit has two modes of operation—(a) coefficient update, and (b) range compression. These operations are described in detail in Section 4.

3.1. Signal Input/Output. With reference to FIG. 3a, the signal inputs to the PLT transfer function circuit for the coefficient update mode of operation are:

| | |
|---|---|
| CD00–CD11 | Coefficient Data Bus (12 inputs) |
| | Segment coefficients - Signed |
| | Gain coefficients - Signed |
| | Offset coefficients - Unsigned |
| | Frequency Range: (0–25) MHz |
| | Volt Range: (GND–+VCC) Volts |
| LS0 | Latch Strobe (1 input) |
| | Strobe to coefficient latches |
| | Active Low Signal |
| | Frequency Range: (0–25) MHz |
| | Volt Range: (GND–+VCC) Volts |
| LSEL0–LSEL4 | Latch Select Address (5 inputs) |
| | Address to select coefficient latches |
| | Frequency Range: (0–25) MHz |
| | Volt Range: (GND–+VCC) Volts |

The 12-bit coefficient data inputs CD11–CD0 are applied over a coefficient data bus CDB. The latch select address inputs LSEL0–LSEL4, and the latch strobe input LS0, effect storage of the coefficient data in an appropriate coefficient latch.

With reference to FIG. 3b, the signal inputs to the transfer function circuit for the range compression mode of operation are:

| | |
|---|---|
| PIXELCLK | External Clock (1 input) |
| | Rising Edge Event |
| | 50% Duty Cycle |
| | Frequency Range: (0–25) MHz |
| | Volt Range: (GND–+VCC) Volts |
| SD00–SD15 | Signal Data Bus (16 inputs) |
| | Two's Complement Input Data |
| | Frequency Range: (0–25) MHz |
| | Volt Range: (GND–+VCC) Volts |
| BPF | Bad Pixel Flag (1 input) |
| | Active High Signal |
| | Frequency Range: (0–25) MHz |
| | Volt Range: (GND–+VCC Volts |
| SDSYNC | Scene Data Sync (1 input) |
| | Indicates scene data input |
| | Active High Signal |
| | Frequency Range: (0–25) MHz |
| | Volt Range: (GND–+VCC) Volts |
| OE | Output Enable (1 input) |
| | Active Low Signal |
| | Frequency Range: (0–50) MHz |
| | Volt Range: (GND–+VCC) Volts |

The 16-bit 2's complement thermal image pixels are input to the PLT transfer function circuit over a signal data bus SD0–SD15, along with a bad pixel flag BPF. The bad pixel flag provided by the thermal imaging system identifies those pixels from defective detectors in the thermal detector array (these pixels are ignored). The pixel clock PIXELCLK is an external clock synchronized with the pixel data output from the thermal detection subsytem—all data transfer operations in the PLT transfer function circuit are synchronized with the rising edge of this clock. The scene data sync signal SDSYNC indicates active scene pixel data. The output enable signal OE enables output of the range-compressed 8-bit video data.

With reference to FIG. 3b, the signal outputs from the PLT transfer function circuit are:

| | |
|---|---|
| VD0–VD7 | Range-Compressed Video Data Bus (8 outputs) |
| | Frequency Range: (0–25) MHz |
| | Volt Range: (GND–+VCC) Volts |
| | Drive Current: 4 mA @ 5 VDC |
| BPF | Bad Pixel Flag (1 output) |
| | Active High Signal |
| | Frequency Range: (0–25) MHz |
| | Volt Range: (GND–+VCC) Volts |
| | Drive Current: 4 mA @ 5 VDC |
| SDSYNC | Scene Data Sync (1 output) |
| | Indicates valid video data out |
| | Active High Signal |
| | Frequency Range: (0–25) MHz |
| | Volt Range: (GND–+VCC) Volts |
| | Drive Current: 4 mA @ 5 VDC |

The 8-bit video data VD0–VD7 is available after PLT range-compression processing according to the invention. For each output video data pixel, the corresponding bad pixel flag BPF and SDSYNC, which are not involved in range compression, are transmitted through the PLT transfer function circuit with appropriate pipeline delay.

3.2. PLT Transfer Function Circuit. The PLT transfer function circuit implements the exemplary range compression operation according to the transfer function:

$$\text{MAX}(0,\text{MIN}(255,((((\text{SDUB-LSX}) * 2^4 + \text{SDLB}) * 2^{LMX[GEXP-7]} * \text{LMX [GMANT]} * 2^{-6}) + \text{LAX})*2^{-1}))$$

| | |
|---|---|
| SDUB | Input Signal Data Upper Bits (SD4–SD15) |
| SDLB | Input Signal Data Lower Bits (SD0–SD3) |
| LSX | 12-bit Segment Breakpoint Coefficient (X can be 0–7 based on a comparison of SDUB and the contents of latches LS1–LS7) |
| LMX | 12-bit Gain Coefficient formed by GEXP and GMANT Fields (X can be 0–7 based on a comparison of SDUB and the contents of latches LS1–LS7) |
| GEXP | 3-bit Gain Exponent Field of the Gain Coefficient LMX |
| GMANT | 9-bit Gain Mantissa Field of the Gain Coefficient LMX |
| LAX | 12-bit Offset Coefficient (X can be 0–7 based on a comparison of SDUB and the contents of latches LS1–LS7) |

As shown in FIG. 3a, PLT transfer function circuit 100 includes segment coefficient logic 110, gain coefficient logic 120 and offset coefficient logic 130. This logic stores the segment, gain and offset coefficients used during range compression operations.

Segment coefficient logic 110 includes a segment coefficient latch network 112, comprising eight 12-bit latches LS0–LS7. Each segment coefficient latch stores a corresponding 12-bit segment breakpoint coefficient received over the coefficient data bus CDB. Segment coefficient latches LS0–LS7 are coupled to respective inputs of a multiplexer 114, and to a comparator network 116.

For each input pixel SD0–SD15, selection of the appropriate segment for that pixel value is accomplished using comparator network 116, together with a segment code selector 118. Comparator network 116 includes seven comparators CMP1–CMP7, each receiving a respective segment breakpoint coefficient from the corresponding latch LS1–LS7. Each comparator CMP1–CMP7 also receives the 12 MSB of the input pixel SD0–SD15. The comparison outputs from comparators CMP1–CMP7 are applied to segment code selector 118.

The segment code selection 118 outputs a 3-bit segment code designating the appropriate segment for the input pixel. This segment code is used by the segment coefficient logic 110, the gain coefficient logic 120 and the offset coefficient logic 130 to select the appropriate segment breakpoint, gain and offset coefficients for use in the corresponding range compression operations (reference breakpoint-subtraction, gain multiplication and offset addition).

In the segment coefficient logic 110, the segment code from segment code selector 118 is applied to multiplexer 114. Multiplexer 114 selects a corresponding one of the eight 12-bit segment breakpoint coeffients from latches LS0–LS7 for use in the reference breakpoint-subtraction operation.

Gain coefficient logic 120 includes a gain coefficient latch network 122, comprising eight 12-bit-latches LM0–LM7. Each gain coefficient latch stores a respective 12-bit gain coefficient received over the coefficient data bus CDB. The gain coefficients stored in latches LM0–LM7 correspond to the segment coefficients stored in the respective segment coefficient latches LS0–LS7. These gain coefficients establish the gain (slope) in the mx+b transformation for the associated segment.

The gain coefficients from latches LM0–LM7 are applied to a multiplexer 124, which selects the appropriate gain coefficient for the segment specified by the segment code. The segment code is provided by the segment selector 118, through a subtraction delay 129 that introduces a pipeline delay corresponding to the reference breakpoint-subtraction operation.

Offset coefficient logic 130 includes an offset coefficient latch network 132, comprising eight 12-bit latches LA0–LA7. Each offset coefficient latch stores a respective 12-bit offset coefficient received over the coefficient data bus CDB. The offset coefficients stored in latches LA0–LA7 correspond to the segment coefficients stored in the respective segment coefficient latches LS0–LS7. These offset coefficients establish the offset level in the m+b transformation for the associated segment.

The offset coefficients stored in latches LA0–LA7 are applied to a multiplexer 134, which selects the appropriate offset coefficient for the segment specified by the segment code. The segment code is provided by the segment selector 118 through subtraction delay 129 and through gain multiplication delay 139, introducing a pipeline delay corresponding to the reference breakpoint-subtraction and gain multiplication operations.

Latch control logic 140 and PLT processor 150 control storage of the segment, gain and offset coefficients in the respective latch networks both initially and during coefficient update operations. Latch control logic 140 receives latch select addresses LSEL0–4 and a latch strobe LS0 from the PLT processor, and provides corresponding latch enable signals to latches LS0–LS7 in segment coefficient logic 110 (EN0–7), latches LM0–LM7 in gain coefficient logic 120 (EN8–15), and the latches LA0–LA7 in offset coefficient logic 130 (EN16–23).

As shown in FIG. 3b, the PLT transfer function circuit 100 includes reference breakpoint-subtraction logic 160, quasi-floating point multiplication logic 170, offset addition logic 180 and clipper logic 190. This logic performs range compression operations using the segment breakpoint, gain and offset coefficients.

The input 2's complement 16-bit pixel data SD0–SD15, along with the bad pixel flag BPF and SDSYNC, are clocked into an input latch IL on the rising edge of PIXELCLK. The pixel data from input latch IL is input to reference breakpoint-subtraction logic 160, and received by a comparator/selector delay 164. The 12 MSB of the input pixel data are also input to each of the comparators CMP1–CMP7 in the segment coefficient logic 110. Comparator/selector delay 164 introduces pipeline delay to accommodate the segment selection operation.

After the pipeline delay introduced by comparator/selector delay 164, the 12 MSB of the pixel data are input to a subtracter 166, while the four LSB are coupled around the subtracter through a subtraction delay 168. Subtracter 166 also receives the appropriate 12-bit (signed) segment breakpoint coefficient from multiplexer 114 (which selects the appropriate segment breakpoint coefficient in response to the segment code from segment selector 118).

Subtracter 166 performs 12×12 2's complement subtraction to reference the input pixel to the associated segment breakpoint. After an appropriate pipeline delay introduced by subtraction delay 168, the four LSB of the input pixel are concatenated with the 12 bits from subtracter 166 to form a 16-bit (signed) referenced pixel data output from the reference breakpoint-subtraction logic 160. The bad pixel flag BPF and SDSYNC are transmitted through comparator/selector delay 164 and subtraction delay 168, which introduce the appropriate pipeline delay.

The 16-bit (signed) referenced pixel data is input to quasi-floating point multiplier logic 170, which implements gain coefficient multiplication in accordance with the PLT transformation mx+b. The referenced pixel data is input to a funnel-shifter 172, which also receives the exponent field (3 MSB) of the 12-bit gain coefficient from multiplexer 124 (which selects the appropriate gain coefficient in response to the segment code from segment selector 118, appropriately delayed by subtraction delay 129). Funnel-shifter 172 performs a funnel-shift exponentiation of the input 16-bit referenced pixel data, effecting a 16-to-9-bit funnel compression.

The 9-bit (unsigned) exponentiated pixel data is input to a 9×9 2's complement multiplier 174. The multiplier receives as its other input the (signed) mantissa field (9LSB) of the 12-bit gain coefficient from multiplexer 124. Multiplier 174 performs a 2's complement multiplication of the (signed) mantissa field and the (unsigned) exponentiated pixel data, outputting 12-bit (signed) gain-multiplied pixel data.

The gain-multiplied pixel data is clocked into a latch 176 on the rising edge of PIXELCLK. The bad pixel flag BPF and SDSYNC are transmitted through quasi-floating point multiplier logic 170 with an appropriate pipeline delay introduced by a gain multiplication delay 178, and latched into latch 176.

The 12-bit (signed) gain-multiplied pixel data is input to offset addition logic 180. A 12×12 adder 182 receives the gain-multiplied pixel data, and receives as its other input the 12-bit (unsigned) offset coefficient from multiplexer 134 (which selects the appropriate offset coefficient in response to the segment code from segment selector 118, through subtraction delay 129 and gain multiplication delay 139).

Adder 182 performs a 12×12 addition, and the LSB of the sum is discarded. Thus, adder 182 outputs 12-bit (signed) gain/offset transformed pixel data formed by the 11 MSB of the 12×12 addition and the adder carry-out bit.

The gain/offset transformed pixel data is clocked into a latch 184 on the rising edge of PIXELCLK, along with the sign bit from the gain-multiplied pixel data output from latch 176, through an addition delay 186. The bad pixel flag BPF and SDSYNC are also transmitted through the addition delay 186 to latch 184.

The 12-bit (signed) gain/offset transformed pixel data is input to clipper logic 190. A clipper 192 receives the gain/offset transformed pixel data (11 MSB from the adder and the carry-out bit), together with the sign bit for the gain-multiplied pixel data from the gain multiplication logic 170. The clipper performs a conventional clipping operation that provides range-compressed pixel data in the standard 8-bit video data format.

The range-compressed 8-bit video data is clocked into an output latch OL by PIXELCLK, along with the bad pixel flag BPF and SDSYNC, which are transmitted through a clipper delay 196 that introduces an appropriate pipeline delay. Output latch OL outputs each 8-bit video data pixel VD0-VD8, along with the associated bad pixel flag and SDSYNC, as long as the output enable signal OE is active.

4. Operation. For the exemplary range-compression application, the PLT transfer function circuit includes two modes of operation—(a) a coefficent update operation, and (b) a range compression operation.

4.1. Coefficient Update. With reference to FIG. 2, the coefficient update mode is used to load the 12-bit segment breakpoint and associated 12-bit gain and offset coefficients into respective latch networks 53, 57 and 59. These coefficients are supplied at regular update intervals by the PLT processor 70 over the coefficient data bus CDB.

To effect storage of the segment, gain and offset coefficients in the appropriate latch, the signal processor sequentially places the coefficients on the coefficient data bus CDB, while providing corresponding latch strobes and latch select addresses to the latch control logic (140 in FIG. 3a). In response, the latch control logic sequentially enables input to the appropriate latch in synchronism with the coefficient data on the coefficient data bus CDB.

The coefficient storage operation is performed each update interval, such as at the beginning of each frame. The stored coefficients are then read-out (with appropriate pipeline delays) in synchronism with the input pixel data during range compression operations in response to a segment code from the segment selector 55.

4.2. Range Compression. With reference to FIG. 2, for the exemplary range compression application, the PLT transfer function circuit compresses 16-bit input scene data (pixel samples) into 8-bit output video data. In discussing this operational mode, reference is made to the following values for an exemplary pixel (values followed by an H are in hexadecimal):

| | |
|---|---|
| Pixel Sample | 2345 H |
| Segment Coefficient | |
| Latch LS4 | 231 H |
| Latch LS5 | 2C8 H |
| Gain Coefficient (Segment 4) | |
| Exponent Field | 011 (Binary) |
| Mantissa Field | 1B H |
| Offset Coefficient (Segment 4) | 081 H |

As described in Section 4.1, the 12-bit segment and associated gain and offset coefficients are loaded via the coefficient data bus CDB into corresponding segment coefficient latches 53, gain coefficient latches 57 and offset coefficient latches 59. In the example, segment coefficient latches LS4 and LS5 are loaded with respective segment breakpoints 231H and 2C8H, gain coefficient latch LM4 is loaded with the exponent field 011 (binary) and the mantissa field 1BH, and the offset coefficient latch LS4 is loaded with the offset coefficient 081H.

For each input 16-bit 2's complement pixel the first range compression operation is to determine the appropriate segment for that pixel value (2345H, in the example). The segment selection operation 52 first compares (using comparators 54) the 12 MSB of the pixel (234H) with each of the segment breakpoints to determine which segment breakpoints are exceeded. The results of this comparison are used (by segment selector 55) to select a segment code corresponding to the highest segment with a segment breakpoint that does not exceed the input pixel value (231H stored in segment coefficient latch LS4).

This segment selection operation is summarized in the following table:

| SEGMENT BREAKPOINT COMPARISON AND SEGMENT CODE SELECTION ||||||||||
|---|---|---|---|---|---|---|---|---|---|
| Input to Segment Selector |||||||| ||
| A ≧ B CMP7 | A ≧ B CMP6 | A ≧ B CMP5 | A ≧ B CMP4 | A ≧ B CMP3 | A ≧ B CMP2 | A ≧ B CMP1 | Segment Code | Selected Latch ||
| X | X | X | X | X | X | 0 | 0 | LS0→ LM0→ | LA0→ |
| X | X | X | X | X | 0 | 1 | 1 | LS1→ LM1→ | LA1→ |
| X | X | X | X | 0 | 1 | 1 | 2 | LS2→ LM2→ | LA2→ |
| X | X | X | 0 | 1 | 1 | 1 | 3 | LS3→ LM3→ | LA3→ |
| X | X | 0 | 1 | 1 | 1 | 1 | 4 | LS4→ LM4→ | LA4→ |
| X | 0 | 1 | 1 | 1 | 1 | 1 | 5 | LS5→ LM5→ | LA5→ |
| 0 | 1 | 1 | 1 | 1 | 1 | 1 | 6 | LS6→ LM6→ | LA6→ |
| 1 | 1 | 1 | 1 | 1 | 1 | 1 | 7 | L27→ LM7→ | LA7→ |

X - Don't Care
→ Indicates Some Pipeline Delay

Once the appropriate PLT segment for the input pixel value is determined by the segment selection operation, and the corresponding segment, gain and offset coefficients that define the PLT transfer function for that pixel are selected, range compression according to the designated mx+b transformation is performed.

After the appropriate PLT segment for the input pixel is determined, the input 2's complement pixel value is referenced to the associated segment breakpoint by reference breakpoint-subtraction operation 61. The 12-bit selected segment breakpoint coefficient (231H) is subtracted using 2's complement from the 12 MSB of the input pixel value (234H). The 4 LSB of the input pixel (5H) bypass this subtraction.

The resulting 12-bit subtraction value (003H) is concatenated with the 4 LSB of the input pixel to provide a 16-bit referenced pixel value (0035H). The precision provided by the 4 LSB of the input pixel value is retained for the subsequent gain multiplication operation.

The reference breakpoint-subtraction operation references the input pixel value to the corresponding segment breakpoint so that the PLT transfer function for a segment becomes $m(x - x_{BP}) + b$, where $x_{BP}$ is the segment breakpoint. By referencing the input pixel to the segment breakpoint, fewer bits are required to represent the pixel, avoiding overflows in the subsequent gain multiplication operation (thereby allowing narrower bus widths to be used).

The next operation is gain multiplication using quasi-floating point multiplication for increased range. The quasi-floating point multiplication operation 62 is performed by a funnel shifter 63 and a multiplier 64. The 16-bit referenced pixel value (0035H) is input to the funnel shifter, which also receives the exponent field (011) of the gain coefficient from the gain coefficient latches 57 (specifically from latch LM4).

Figure 4:
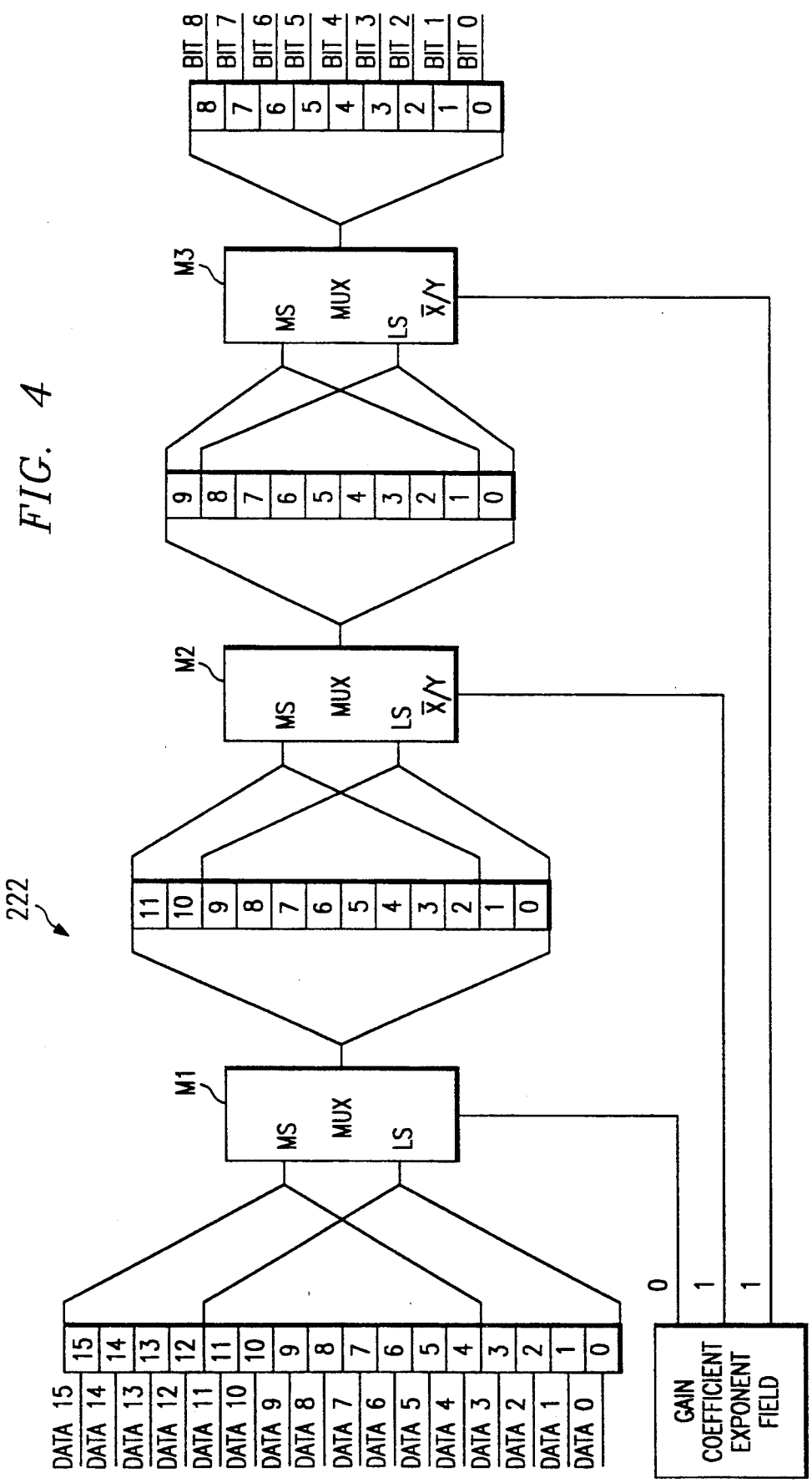
FIG. 4 is a data flow diagram illustrating operation of a funnel-shifter used for exponentiation.

As illustrated in FIG. 4, the funnel-shifter performs both a shift exponentiation and a 16-to-9-bit range compression. In this funnel-shift exponentiation, no attempt is made to prevent or compensate for the possible discard of an MSB. This optional design choice limits the complexity of the funnel shifter operation without significantly impacting gain multiplication precision.

The 16-bit referenced pixel value is applied to a funnel-shift multiplexer M1. The multiplexer is responsive to the MS bit of the gain coefficient exponent field (exponent bit 0) to select either the MS 12 bits (exponent bit equal to 0) or the LS 12 bits (exponent bit equal to 1).

The 12-bit value selected by funnel-shift multiplexer M1 is applied to a second funnel-shift multiplexer M2. This multiplexer is responsive to the next-MS bit of the gain coefficient exponent field (exponent bit 1) to select either the MS 10 bits (exponent bit equal to 0) or the LS 10 bits (exponent bit equal to 1).

The 10-bit output from funnel-shift multiplexer M2 is applied to a third funnel-shift multiplexer M3. This multiplexer is responsive to the LS bit of the gain coefficient exponent field (exponent bit 1) to select either the MS 9 bits (exponent bit equal to 0) or the LS 9 bits (exponent bit equal to 1), which porvides the 9-bit unsigned exponentiated pixel value (003H) of the funnel shifter output.

As shown in FIG. 2, the 9-bit exponentiated pixel value from funnel shifter 63 (003H) is applied to multiplier 64, which multiplies the 9-bit exponentiated pixel value by the 9-bit gain coefficient mantissa field (1BH) from the gain coefficient latches 57 (specifically from latch LM4). Multiplier 64 performs 2's complement multiplication because, while the exponentiated pixel value is unsigned, the gain coefficient mantissa field is signed (allowing negative gain). The $9 \times 9$ multiplication yields an 18-bit value, the 6 LSB of which are discarded because they provide a degree of precision that in this exemplary range compression application is unnecessary. The result of the gain multiplication operation is a 12-bit (signed) gain-multiplied pixel value (OO1H).

To complete the PLT mx+b transformation, the offset addition operation 66 adds to the 12-bit gain-multiplied pixel value the appropriate 12-bit (unsigned) offset coefficient (081H) from the offset coefficient latches 59 (specifically from latch LA4). The addition of the 12-bit signed gain-multiplied pixel (OO1H) and the corresponding 12-bit unsigned offset coefficient (081H) yields a 13-bit value, including a sign bit and a carry-out bit. Since the LSB of the 12-bit unsigned offset coefficient provides the means for handling round-off error, the LSB of the sum can be discarded. The resulting output from the addition operation is a 12-bit (11 MSB from the addition and a sign bit) gain/offset transformed pixel value (042H).

Because each input pixel is referenced to a segment breakpoint by the reference breakpoint-subtraction operation, the gain/offset pixel value provided by the gain multipliation and offset addition operations will normally be range-limited to an unsigned 8-bit magnitude value (i.e., no more than 255). That is, the 12-bit gain/offset pixel value provided by the PLT mx+b transformation will normally be no more than OFFH, and therefore, compressable into the 8-bit video data format merely by discarding the MS 4 magnitude bits, or otherwise limiting the addition operation to 8-bits.

However, PLT transfer functions can be devised with non-linearities that would cause the gain/offset pixel value to exceed OFFH. Unexpected computational errors may cause the same result for any transfer function. In this case, discarding bits or otherwise limiting the addition operation to 8-bits magnitude could result in underflow/overflow conditions that would cause unwanted wrap-around.

To handle underflow/overflow conditions, the final operation of the PLT transfer function circuit is the conventional clipper operation 68, which clips the 12-bit gain/offset transformed pixel value output from the offset addition operation 66. That is, 12-bit gain/offset transformed pixel values greater than OFFH are clipped so that values less than zero become zero and values greater than 255 become 255. Because of the reference breakpoint subtraction operation, this clipper operation is usually not necessary except in cases of errors in computation or non-linearities introduced between segments of the PLT transformation. Under normal operation, the clipper operation does not affect the gain/offset transformed pixel output from the gain multiplication and offset addition operations because that pixel value will normally be within the 8-bit video data format range.

The range-compressed output 8-bit video data (41H) provided by the PLT transfer function circuit is applied to the video data bus for use in video display.

5. Conclusion. The PLT transfer function circuit of the invention uses a piecewise linear transformation to approximate a non-linear transfer function The PLT technique divides the complete range of input digital sample values into a selected number of PLT segments, each characterized by a linear transfer function mx+b.

For an arbitrary number of input samples, appropriate segment ranges are determined, with each segment being defined by an initial segment breakpoint coefficient. For each segment, the appropriate gain (m) and offset (b) coefficients of the PLT transformation mx + b are computed.

For each input sample, the appropriate PLT segment breakpoint coefficient, and associated gain and offset coefficients, are selected and used to implement the corresponding mx + b transformation for that sample. The input sample can be referenced to its associated PLT segment breakpoint to reduce bus widths. A quasi-floating point multiplication operation can be used to obtain greater range for the multiplication operation.

This PLT transfer function approach to signal processing has generalized applicability to control systems in which the desired output is related to the input by a non-linear transfer function. Design considerations include the selection of appropriate segmentation and associated gain and offset coefficients, and the determination of how often those coefficients should be updated.

Although the present invention has been described with respect to a specific, preferred embodiment, various changes and modifications may be suggested to one skilled in the art, and it is intended that the present invention encompass such changes and modifications as fall within the scope of the appended claims.

What is claimed is:

1. A signal processing system implementing a non-linear PLT transfer function approximated by a piecewise linear transformation (PLT), comprising:
   a PLT processor capable of receiving input data and processing said input data in order to produce a plurality of coefficients corresponding to said processed input data, said coefficients include segment, gain, and offset coefficients;
   a PLT transfer function circuit coupled to said PLT processor and capable of receiving said input data and said coefficients in order to range compress said input data into a smaller output data format according to the non-linear PLT transfer function, the non-linear PLT transfer function determined from said coefficients and from a plurality of segments established by said PLT transfer function circuit from said input data according to a range of values of said input data, said coefficients corresponding to each of said plurality of segments.

2. The signal processing system of claim 1, wherein said PLT processor performs a histographic distribution of said input data values to produce said coefficients necessary to derive the non-linear PLT transfer function.

3. The signal processing system of claim 2, wherein said PLT processor updates said coefficients at selected intervals using said histographic distribution of said input data for such intervals.

4. The signal processing system of claim 3, wherein said input data comprises a sequence of digital samples, each with an associated input data value.

5. The signal processing system of claim 1, wherein said PLT processor is responsive to said input data to provide said segment coefficients identifying each of said plurality of segments.

6. The signal processing system of claim 5, wherein each segment coefficient comprises a segment breakpoint corresponding to an initial data value of said range of values of said input data for a corresponding segment.

7. The signal processing system of claim 6, wherein said PLT transfer function circuit comprises:
   reference breakpoint subtraction logic circuitry capable of subtracting from each input data value a corresponding segment breakpoint coefficient such that each of said input data values is referenced to said corresponding segment breakpoint.

8. The signal processing system of claim 1, wherein said PLT transfer function circuit further comprises:
   a gain multiplication logic circuit for multiplying each of said values of said input data by a corresponding gain coefficient to obtain a gain multiplication value;
   an offset addition logic circuit for adding to said gain multiplication value a corresponding offset coefficient; and
   a coefficient logic circuit capable of storing said gain and offset coefficients provided by said PLT processor, and capable of providing gain and offset coefficients respectively to said gain multiplication logic circuit and said offset addition logic circuit in synchronism with said input data.

9. A signal processing system of claim 8, wherein said coefficient logic circuit comprises:
   a gain coefficient logic circuit capable of storing said gain coefficients, and capable of providing said gain coefficients to said gain multiplication logic circuit; and
   an offset coefficient logic circuit capable of storing said offset coefficients, and capable of providing offset coefficients to said offset addition logic circuit.

10. The signal processing system of claim 9, wherein said gain and offset coefficients are stored in respective latches.

11. The signal processing system of claim 1, wherein said PLT transfer function circuit comprises:
    segment selection logic circuitry synchronized with said input data for sequentially generating segment codes representative of corresponding segments for said input data values.

12. The signal processing system of claim 11, wherein said segment selection logic circuitry comprises:
    comparison logic circuitry capable of comparing each input data value with each segment coefficient, and capable of providing comparison signals representative of which segment includes which of said input data value within its assigned range; and
    a segment selector responsive to said comparison signals and capable of generating said segment codes.

13. The signal processing system of claim 12, wherein said PLT transfer function circuit comprises:
    segment coefficient logic circuitry capable of storing said segment coefficients, and capable of providing said segment coefficients to said segment selection logic circuitry.

14. The signal processing system of claim 1, wherein said gain coefficient includes an exponent field and a mantissa field, and wherein said gain multiplication logic circuit comprises:
    an exponentiation logic circuit for exponentiating said input data values using said gain coefficient exponent field to obtain an exponentiated input data value; and a mantissa multiplier logic circuit for multiplying said exponentiated input data value by a corresponding gain coefficient mantissa field.

15. The signal processing system of claim 14, wherein said exponentiation logic circuit comprises a funnel shifter capable of performing the exponentiation operation and providing a selected amount of range compression.

16. A range compression system implementing a non-linear PLT transfer function approximated by a piecewise linear transformation (PLT) to range compress input digital data samples having an input range into output data samples having a compressed range, comprising:
- a PLT processor capable of receiving the input digital data samples and processing the input digital data samples to produce a plurality of coefficients corresponding to said processed input digital data samples, said coefficients including segment, gain, and offset coefficients;
- a PLT transfer function circuit coupled to said PLT processor and capable of receiving said input digital data samples and said coefficients in order to range compress said input digital data samples into a smaller output format according to the non-linear PLT transfer function, the non-linear PLT transfer function determined from said coefficients and from a plurality of segments established by said PLT transfer function circuit from said input digital data samples according to a range of values of said input digital data samples, said coefficients corresponding to each of said plurality of segments, said PLT transfer function circuit comprising:
  - a segment selection logic circuit synchronized with the input digital data samples for sequentially generating segment codes representative of corresponding segments for the input digital data samples;
  - a gain multiplication logic circuit responsive to each segment code for multiplying a corresponding input digital data sample by a corresponding gain coefficient to obtain a gain multiplication value; and
  - an offset addition logic circuit responsive to each segment code for adding a corresponding offset coefficient to said gain multiplication value such that each input digital data sample is transformed into a range-compressed output data sample according to the non-linear PLT transfer function.

17. The range compression system of claim 16, wherein said PLT processor performs a histographic distribution of the input digital data sample values, such that for each segment a magnitude of a corresponding gain coefficient is related to a proportion of input digital data sample values that are within said segment.

18. The range compression system of claim 17, wherein said segment, gain and offset coefficients are updated at selected intervals using said histographic distribution of the input digital data samples for such intervals.

19. The range compression system of claim 18, wherein the input digital data samples comprise image pixel samples that are to be range compressed into a video data format, and wherein, for each update interval, said gain coefficients are selected to achieve optimum contrast based on said histographic distribution of image pixel samples within said segments.

20. The range compression system of claim 16, wherein each segment coefficient comprises a segment breakpoint corresponding to an initial data value for said range of input digital data samples for a corresponding segment.

21. The range compression system of claim 20, wherein said PLT transfer function circuit comprises:
- a reference breakpoint subtraction logic circuit for subtracting from each input digital data sample a corresponding segment breakpoint coefficient prior to gain multiplication by said gain multiplication logic circuit or offset addition by said offset addition logic circuit;
- such that the input digital data sample is referenced to said segment breakpoint.

22. The range compression system of claim 16, wherein said PLT transfer function circuit comprises:
- a coefficient logic circuit capable of storing said segment, gain and offset coefficients provided by said PLT processor, and capable of providing gain and offset coefficients respectively to said gain multiplication logic circuit and offset addition logic circuit in synchronism with the input digital data samples.

23. The range compression system of claim 22, wherein said coefficient logic circuit comprises:
- a segment coefficient logic circuit capable of storing segment coefficients, and capable of providing segment coefficients to said segment selection logic circuit in synchronism with the input digital data samples;
- a gain coefficient logic circuit capable of storing gain coefficients, and capable of providing gain coefficients to said gain multiplication logic circuit in response to said segment codes; and
- an offset coefficient logic circuit capable of storing offset coefficients, and capable of providing offset coefficients to said offset addition logic circuit in response to said segment codes.

24. The range compression system of claim 23, wherein said segment, gain, and offset coefficients are stored in latches.

25. The range compression system of claim 16, wherein said segment selection logic circuit comprises:
- a comparison logic circuit capable of comparing each input digital data sample with each segment coefficient, and capable of providing comparison signals representative of which segment includes which input digital data sample value within its assigned range; and
- a segment selector responsive to said comparison signals and capable of generating said segment codes.

26. The range compression system of claim 16, wherein said gain coefficient includes an exponent field and a mantissa field, and said gain multiplication logic circuit comprises:
- an exponentiation logic circuit capable of exponentiating the input digital data sample using a corresponding gain coefficient exponent field specified by a corresponding segment code to obtain an exponentiated input sample; and
- a mantissa multiplier logic circuit capable of multiplying said exponentiated input sample by a corresponding gain coefficient mantissa field.

27. The range compression system of claim 26, wherein said exponentiation logic circuit comprises a funnel shifter capable of performing the exponentiation operation and providing a selected amount of range compression.

28. A method of signal processing using a non-linear piecewise linear transformation (PLT) transfer function approximated by a PLT, comprising the steps of:
(a) providing a PLT processor;
(b) processing input data in said PLT processor to produce a plurality of coefficients corresponding to said input data and establish a plurality of segments according to a range of values of said input data, said coefficients including segment, gain and offset coefficients;
(c) providing a PLT transfer function circuit coupled to said PLT processor; and
(d) receiving said input data and said coefficients from said PLT processor at said transfer function circuit to range compress said input data into smaller output data format according to the non-linear PLT transfer function, the non-linear PLT transfer function determined from said coefficients and from a plurality of segments established by said PLT transfer function circuit from said input data according to a range of values of said input data, said coefficients corresponding to each of said plurality of segments.

29. The signal processing method of claim 28 wherein said step of processing input data in said PLT processor includes performing a histographic distribution of said values of said input data.

30. The signal processing method of claim 29 and further comprising the step of updating said coefficients at selected intervals using said histographic distribution of said input data for such intervals.

31. The signal processing method of claim 28, further comprising the step of providing a segment coefficient that corresponds to each of said segments.

32. The signal processing method of claim 31, wherein said segment coefficient comprises a segment breakpoint corresponding to an initial data value of said input data for a corresponding segment.

33. The signal processing method of claim 32, further comprising the step of referencing said input data to said segment breakpoint.

34. The signal processing method of claim 31, further comprising the step of sequentially generating segment codes representative of corresponding segments for each input data value in synchronism with said input data.

35. The signal processing method of claim 34, wherein the step of generating segment codes comprises the steps of:
comparing each input data value with each segment coefficient;
providing comparison signals representative of which segment includes which input data value within its assigned range; and
generating said segment codes in response to said comparison signals.

36. The signal processing method of claim 28, further comprising the steps of:
storing said coefficients; and
providing said coefficients in synchronism with said input data.

37. The signal processing method of claim 28, wherein said gain coefficient includes an exponent field and a mantissa field, and wherein the step of applying said coefficients to corresponding segments comprises the steps:
exponentiating each input data value using said gain coefficient exponent field to obtain an exponentiated input data value; and
multiplying said exponentiated input data value by said gain coefficient mantissa field.

38. The signal processing method of claim 37, wherein said exponentiation step is performed by a funnel shifter that both performs said exponentiation step and provides a selected amount of range compression.

* * * * *